Aug. 22, 1933.  F. FLICK  1,923,085
PORTABLE EQUIPMENT FOR COURSING PARKS
Filed Nov. 8, 1930  7 Sheets-Sheet 1

INVENTOR.
Franklin Flick.
BY Townsend, Loftus & Abbett
ATTORNEYS.

Patented Aug. 22, 1933

1,923,085

UNITED STATES PATENT OFFICE 1,923,085

PORTABLE EQUIPMENT FOR COURSING PARKS

Franklin Flick, San Francisco, Calif.

Application November 8, 1930. Serial No. 494,346

7 Claims. (Cl. 104—121)

This invention relates to equipment for coursing parks, such as used in the racing of dogs, and especially to an equipment which is sectional and removable for storage, transportation or otherwise.

Coursing parks such as used in the racing of dogs require considerable equipment, such as boundary fences to form the race course, a rail track at one side of the race course, a controllable power driven car on the rail track, a lure, a supporting arm for the lure carried by the power driven car, a housing for the car and trackway to prevent injury of the dogs, starting and stopping apparatus for the dogs, etc.

Practically all of the equipment required is usually permanently installed on a race course and cannot be readily moved from place to place. The object of the present invention is to generally improve and simplify the construction and operation of equipment of the character described; to provide equipment of this character which is sectional in construction to permit ready erection and assembly of the equipment and, conversely, quick taking down and packing thereof for storage, transportation, and otherwise, so as to permit the equipment to be moved from place to place; to provide a sectional fence structure which also forms a support for a sectional rail track; and, further, to provide a guard or housing for the rail track and car which is constructed of wire screen panels to increase visibility over the entire race course.

The portable equipment required in connection with the coursing park is shown by way of illustration in the accompanying drawings, in which—

Figure 1:
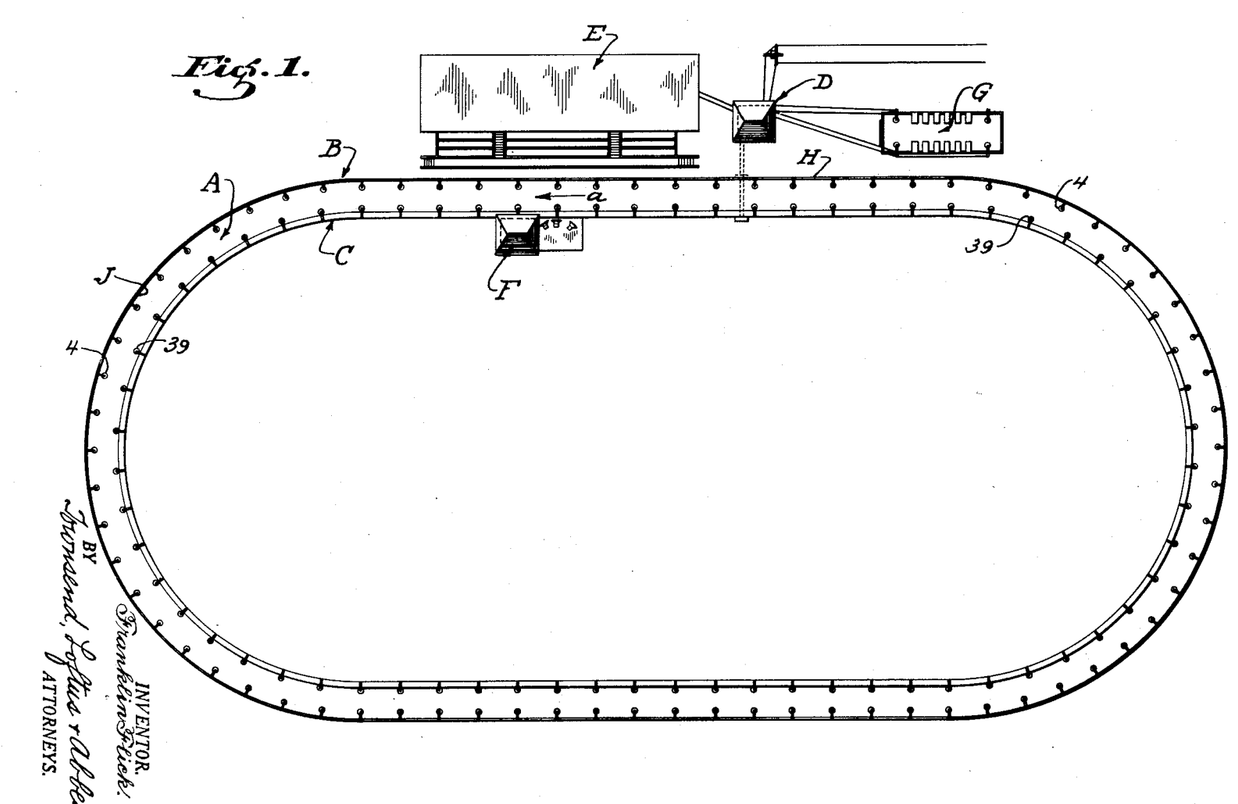
Fig. 1 is a plan view showing the lay-out of a coursing park.
Figure 2:
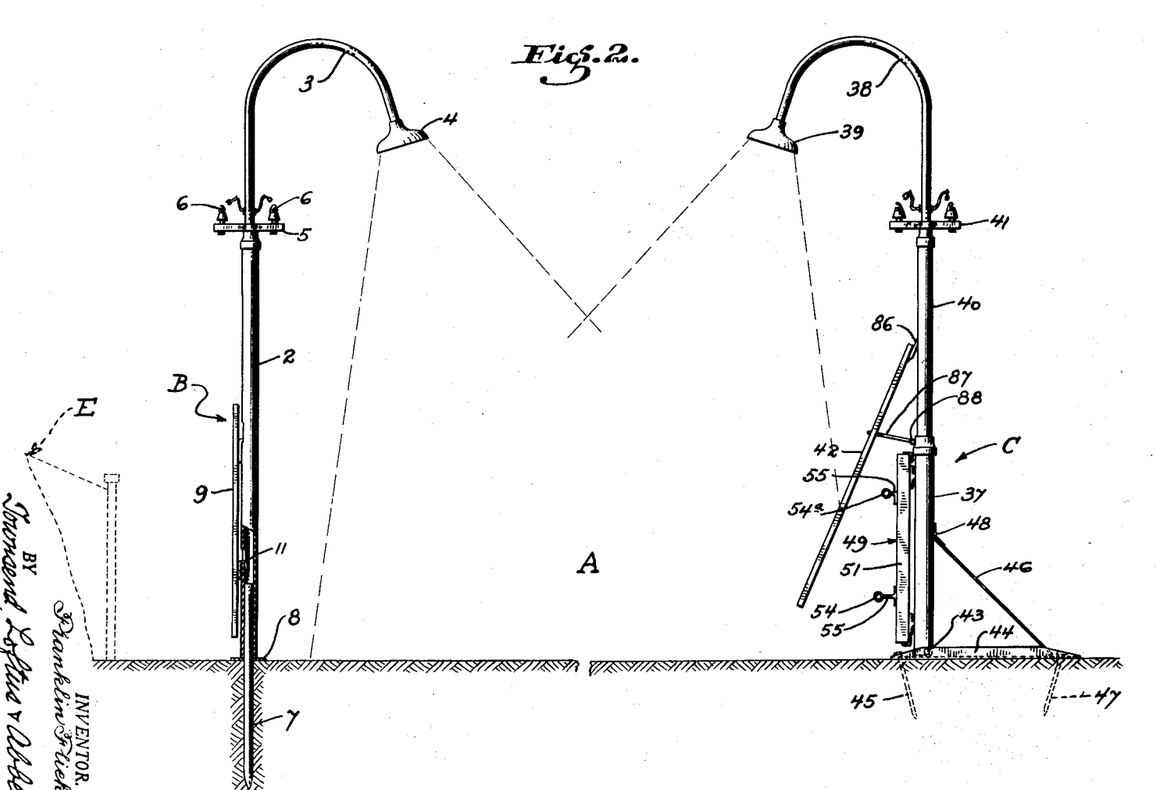
Fig. 2 is an enlarged cross section of the race course showing the inner and outer boundary fences, the rail track and the housing or guard enclosing the same.
Figure 3:
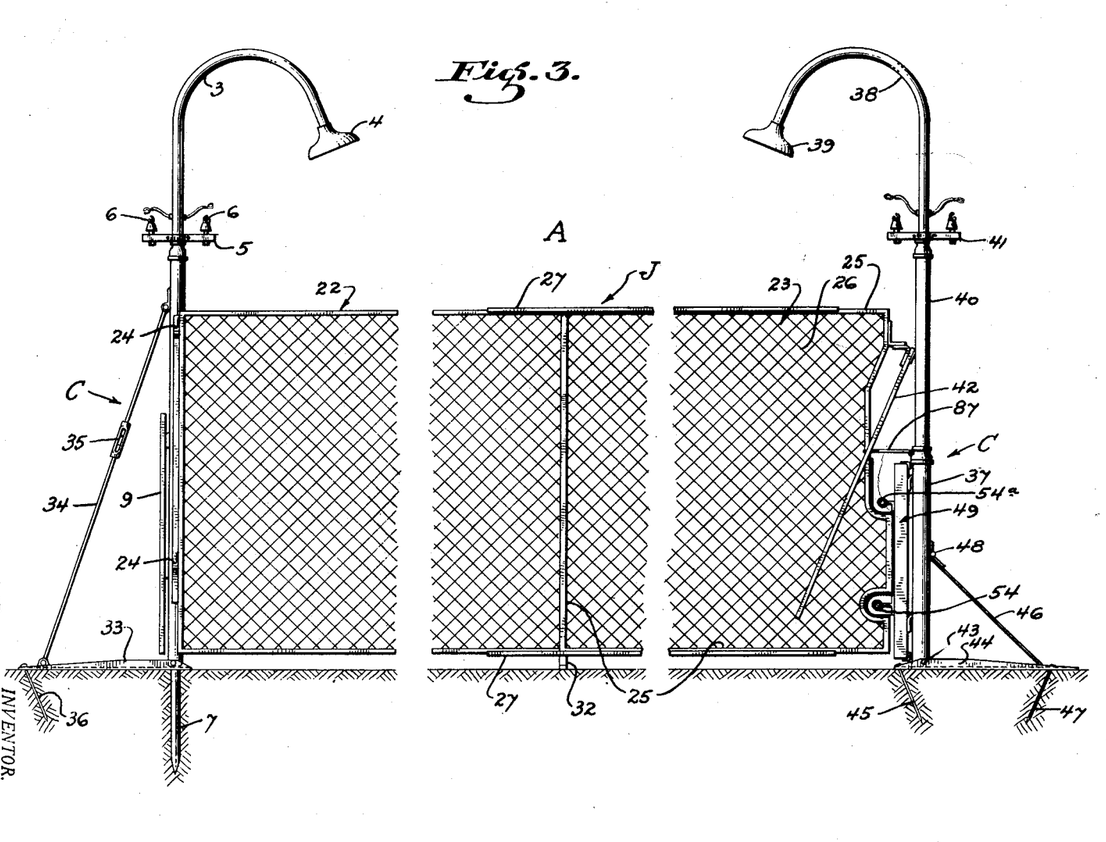
Fig. 3 is a similar cross section showing the stopping gate placed transversely of the race course.

Referring to the drawings in detail and particularly Fig. 1, A indicates a race course which is enclosed by an outer boundary fence B, and an inner boundary fence C. Mounted within the race course and at one side thereof, preferably inside, is a trackway and mounted on the trackway and driven thereon is a car which is provided with an extending arm on the outer end of which is mounted a lure in the form of a rabbit, or the like. This trackway extends completely around the race course and the car is provided with an electric motor to drive the same. Electric power is delivered to the rails upon which the car travels and the sped at which the car is driven is controlled by an operator mounted in a control tower generally indicated at D. The people viewing the races may be seated in a grandstand indicated at E, or may be stationed all around the exterior boundary fence. The judges' stand is preferably arranged at a point indicated at F. The kennels in which the dogs are kept are shown at G. An entrance gate to permit the dogs to enter the race course is located substantially at the point indicated at H and a stop gate is arranged somewhere in the vicinity of the reference character J. All this will be later described.

When a dog race is to take place the dogs are brought from the kennels G and are admitted to the race course through the entrance gate H. They are here placed in a starting cage and the car which propels and supports the lure is propelled along the track to a point in front of the dogs. At a signal from the judges' stand a gate in the starting cage is raised and the dogs are all simultaneously released and as the car propelling and supporting the lure is traveling in the direction of arrow a, the dogs will follow. The length of the race may be completely around the course or partially around the same, hence it is not necessary to change the position of the stopping gate J as the position of the starting cage will determine the length of the race. If desired, the stopping gate, which is swung crosswise of the track to stop the dogs at the end of the race, may be changed to any position desired.

The equipment so far described is usually permanently installed on the race course and as such cannot be readily taken down, or transported from place to place. A portable structure would be exceedingly desirable as such a structure could be readily taken down and transported from place to place, for instance where carnivals or something of unusual attraction is taking place. The present invention relates to a portable structure and will be described in detail. The portable equipment comprises the outer boundary fence B, the entrance gate H, the stopping gate J, the inner boundary fence C, the rail track supported by the inner fence, the lure carrying and propelling car exterior on the rail track and the guard panels enclosing the car and rail track. Each part forming the equipment will be described in detail.

The outer boundary fence

Figure 17:
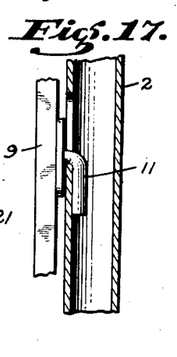
Fig. 17 is an enlarged vertical section taken on line XVII—XVII of Fig. 15.
Figures 18, 19, 20, 21:
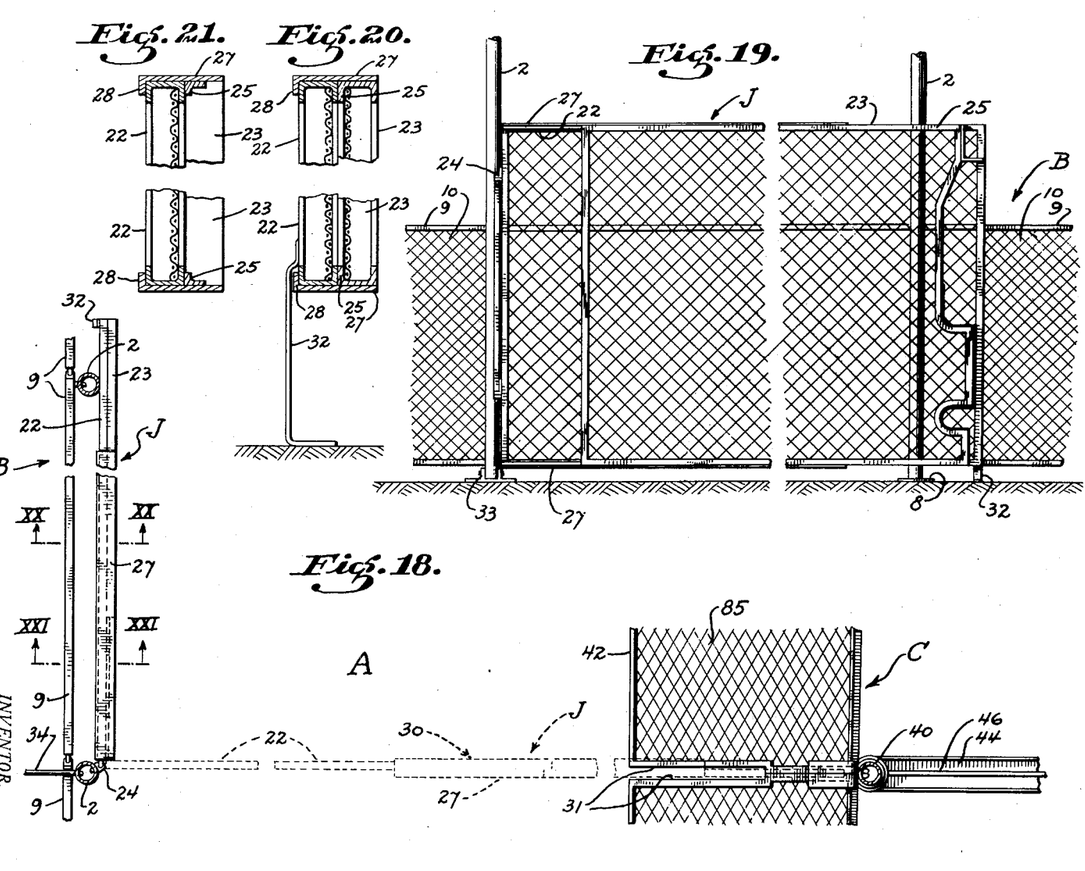
Fig. 18 is an enlarged plan view showing the stop gate in closed and extended position.
Fig. 19 is a front view of the stop gate showing the two sections thereof telescoped with relation to each other.
Figs. 20 and 21 are enlarged cross sections taken on lines XX—XXI of Fig. 18.

The construction of this fence is best illustrated in Figs. 2, 13, 15 and 17. It consists of tubular metal posts such as indicated at 2, the upper ends of which are reduced in diameter and bent to form goose necks 3 whereby flood lights, or the like, such as indicated at 4 may be supported. The posts are also equipped with cross arms 5 and these may carry overhead wires 6 to supply the lamps with current. The posts are supported in the ground by means of iron or steel pegs 7, which are driven into the ground. The posts are slipped over the upper projecting ends of the pegs and their downward movement on the pegs is limited by base flanges 8, which engage the surface of the ground. The posts, thus erected, are tied together by fence panel sections, see Fig. 13. Each panel section extends from post to post. It consists of an exterior frame 9, constructed of angle iron, or the like, and to this is secured a heavy mesh wire netting 10. At one end of each panel section is welded a pair of hook-shaped members 11, one adjacent the upper end of the panel and one adjacent the lower end thereof, and these hooks interlock with the posts 2 as shown in Fig. 17.

That is, the posts are slotted at two points as shown and the slots are sufficiently long to permit the hook-shaped members to enter and the panel sections are then dropped downwardly and the hooks are thus engaged. A pair of perforated lugs such as shown at 12 are also welded or otherwise secured to the same end of the panel and hook-shaped members 13 are welded, or otherwise, secured to the end of an adjacent panel, hence the panel sections forming the fence are not only interlocked with relation to the posts 2 but also with relation to each other as the hooks 11 enter the posts and the hooks 13 enter the perforated lugs 12, all as clearly shown in Figs. 15 and 17. This method of interlocking the posts and panel sections produces an exceedingly rigid structure and braces the posts 2 against movement to or away from each other.

It will be noted that the posts and panels are interchangeable, hence requiring no particular skill or exact placement during erection.

The entrance gate

Figures 14, 15:
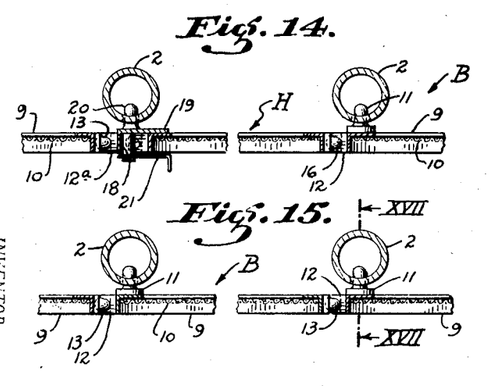
Fig. 14 is an enlarged sectional view of the outer boundary fence showing the manner of supporting and securing an entrance gate.
Fig. 15 is an enlarged cross section of the outer boundary fence showing the manner in which the fence panels are connected with relation to each other and the fence posts.
Figure 16:
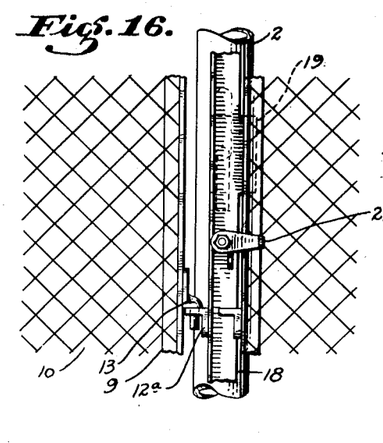
Fig. 16 is an enlarged detail front section showing one of the posts employed in conjunction with the entrance gate.

This gate is best illustrated in Figs. 14 and 16. The gate proper consists of nothing more or less than one of the fence panels, on one end of which is welded, or otherwise secured, a pair of hook-shaped members 16. These are insertable in the perforated lugs 12 of an adjacent fence panel section and when the hooks are thus inserted the gate is supported and a pivot is also provided to permit the gate to swing outwardly. Means must also be employed for retaining the gate in a closed position. This is accomplished by providing an elongated panel shaped member such as shown at 18. On this member is welded, or otherwise secured, a pair of plates 19, one adjacent the upper and one adjacent the lower end of the panel member 18. Each plate is provided with a hook-shaped member 20 adapted to enter the slotted post 2 and the panel shaped member is in this manner supported with relation to the post 2. On one side of the panel shaped member are welded, or otherwise secured, perforate lugs 12a similar to the perforated lugs used on the ordinary fence panel sections. These serve the same function and permit an adjacent fence panel section to be attached. The panel shaped member 18 is also provided with a pivoted latch such as shown at 21. The plates 19 form stop members for the gate when closed and the latch 21 secures the gate in closed position. The gate may be any fence panel section and as such may be operated in the fence between any two posts wherever desired as the channel shaped member 18 may be hooked on to any post.

The stop gate

This gate is best illustrated in Figs. 3, 18, 19, 20 and 21. It is supported with relation to the outer boundary fence and consists of two main sections 22 and 23, the section 22 being pivotally secured with relation to one of the posts 2 while the section 23 is slidably mounted on the section 22. The section 22 consists of an outer frame constructed of angle iron or the like. Its inner end is pivotally supported as at 24 to the post. The frame 22 is covered with a heavy wire mesh in a manner similar to the fence panel sections and it is also covered with canvas to obstruct vision. The gate section 23 also consists of a main frame, such as shown at 25, which is constructed of angle iron, or the like, and this is covered with a wire mesh and canvas such as shown at 26. The upper and lower rails of the frame 25 are provided with extending arms 27. These are held on the panel frame 22 by flanges such as shown at 28 and 25, and as such form a sliding connection and a support for the gate 23 permitting it to be moved inwardly or outwardly on the gate 22 as desired. Gate section 23 is normally telescoped or moved inwardly on the gate section 22 but the two gate sections are swung to assume a position parallel to the outer fence as shown at 29 in Fig. 18, but when the gate is to be used it is swung at right angles to the fence or crosswise of the race course and the gate section 23 is pulled outwardly so as to form a stop or barrier which extends completely across the course, this position being shown in Fig. 3 and at 30 in Fig. 18. One end of the gate when thus positioned is supported by the hinges 24 while the opposite end projects between guard panels supported by the inner boundary fence, the guard panels being slightly separated as shown at 31 to receive, support and brace the end of the gate when it assumes a stop or barrier position. A supporting leg which is adapted to slide over the surface of the course may also be provided as indicated at 32 to relieve the hinges 24 of as much strain as possible. The weight of the gate when extended crosswise of the track is considerable and the post 2 which supports the same will accordingly require extra bracing. This is accomplished by providing a pivoted foot section such as shown at 33, see Fig. 3, and a brace rod 34. This is connected with the upper end of the post and a turn buckle 35 permits tightening or slacking as desired, the pivoted foot section 33 being held against the ground surface by a peg 36 driven through the outer end thereof. The post thus braced is amply secured to support the weight of the gate.

*The inner fence and rail structure*

The inner fence and rail structure is best illustrated in Figs. 2, 4, 5 and 6. It consists of tubular metal posts such as shown at 37. These posts terminate in goose necks 38 which support flood lights 39 and they employ an intermediate section such as shown at 40 above which is mounted a cross arm 41 to support the line wires whereby current is delivered to the flood lights 39. The posts 37 supporting the fence or inner barrier require a more rigid support than the outer fence as they carry the rails 54, 54a upon which the car travels and they also carry the protecting panels indicated at 42. In order to obtain a support which has rigidity and stability the lower ends of the post 37 are pivotally supported as at 43 in base plates 44. These are panel shaped and lie flat on the ground surface. The inner ends are perforated to receive securing pegs 45 and the outer ends are provided with several perforations to receive a brace arm 46 and an outer securing peg 47. If the ground surface is substantially flat the base plate and brace arm will assume the position shown in Fig. 2. On the other hand, if the ground is slightly sloping in one direction or the other, post 37 may be set vertical by merely moving the lower end of the brace arm 46 and the peg 47 inwardly or outwardly on the base plate and then driving the peg through, it being understood that the brace 46 is provided with a perforated lower end to receive the peg. The pivotal connections 43 and 48 are further important as they permit these members to fold into parallelism during shipment, or storage. The posts when erected function as a support for the rails 54, 54a and the car traveling thereon, and they also function as a support for the projecting panels 42. The individual posts are connected by panels generally indicated at 49. These panels are best illustrated in Figs. 4, 5, 6 and 8. Each panel consists of a rectangular shaped frame constructed of upper and lower angle bars 50 and end and center wooden bars such as shown at 51. These are nailed, or dovetailed, or otherwise secured, with relation to each other and they are covered with a wire mesh shown at 52 to form a barrier and also to form one side of a closure in which the car travels. One end of each panel is provided with hook-shaped members at the upper and lower ends, such as shown at 53, see Fig. 6, and they are secured by passing them through slots formed in the posts and in a manner similar to the method of securing the outer fence panels. These hooks, however, only support one end of each panel, the opposite end being supported by the rails as will hereinafter be described.

The rails employed in the present instance are tubular in form and comprise an upper sectional rail 54a and a lower sectional rail 54. The rail sections are of the same length as the panels and are secured thereto by T and L-shaped brackets 55 which are fastened to the end and center sections of the panels by lug screws or the like and they are secured to the tubular rail sections by being welded or otherwise secured. One end of each set of tubular rails is provided with an extending pin 56 which is welded in place or otherwise secured, see Fig. 8. These pins have an outside diameter the same as the interior diameter of the tubular rails and as such are insertable in the adjacent ends of the tubular rails which are attached to the following panel by such endwise insertion. A connection is made between the end sections of two adjacent panels, a support is formed for one end of each panel and a continuous rail surface with electrical contact is at the same time produced. As the rails are secured to the panels by connections with the wooden bars 51 they are adequately insulated from each other and from the panels. Electric current is supplied to the upper and lower rails and the amount of current supplied is controlled by a rheostat switch or the like mounted in the control tower so that the speed of the car traveling upon the rails may be regulated at will. It should be noted that each panel is identical in construction and it serves three functions, first, it connects the main supporting posts 37 longitudinally, secondly, it forms a support for the rails 53 and 54 and the car traveling thereon, and third, it forms a fence and one side of the enclosure in which the car travels. Separation of the panels with relation to each other is prevented by employing one or more latches such as shown at 57, see Fig. 5.

*The lure supporting and propelling car*

The car is best illustrated in Figs. 4 and 9 to 12, inclusive. It consists of an elongated cast metal frame generally indicated at 60 on the central portion of which is mounted an electric motor 61. The motor shaft extends an equal distance on opposite sides of the motor and is provided with worm gear pinions 62 which intermesh with worm gears 63. These gears are mounted on shafts 64 journaled in the cast metal frame 60 and are positioned at right angles to the motor shaft. The inner end of each shaft 64 has keyed or otherwise secured thereon a grooved driving wheel 65, see Figs. 9 and 11. These wheels ride on the upper surface of the lower track 54 and are held thereon by an upper set of wheels 66 and 67 and by lower idler wheels 68. These latter wheels are journaled on pins 69 secured in a downwardly projecting flange 70 formed on the lower surface of the metal frame. A secondary or upper metal frame 71 is secured to the main frame by means of bolts 72 and blocks of insulating material such as shown at 73 are interposed between the two frames to prevent current flow through the frame, the bolt 72 passing through the two frame sections and the insulating blocks 73 being insulated as shown at 74, see Fig. 12. The upper frame functions as a support for the guide wheels 66 and 67 which engage the upper track indicated at 54a. They are journaled on pins 66a and 67a which are secured in a sliding head 75. This head is secured to the secondary or upper frame 71 by means of bolts such as shown at 76. These bolts are rigidly secured in the frame 71 but they extend through vertical slots 77 formed in the sliding head indicated at 75, hence permitting this head together with the guide wheels 66 and 67 to rise and fall due to any variation in spacing between the rails 54a and 54. The electric current entering the rail 54a passes through the wheels 66 and 67 into the upper frame 71. This is connected by a wire 78 with one terminal of the motor and the other terminal of the motor being connected through a wire 79 with the lower metal frame 60 which in turn is grounded or in electrical contact with the lower rail 54 through the wheels 65 and 68. A circuit is in this manner completed through the motor 61 which drives the car and as the current flow is controlled from the control tower its speed along the trackway may be regulated.

Figures 4, 6, 7, 8:
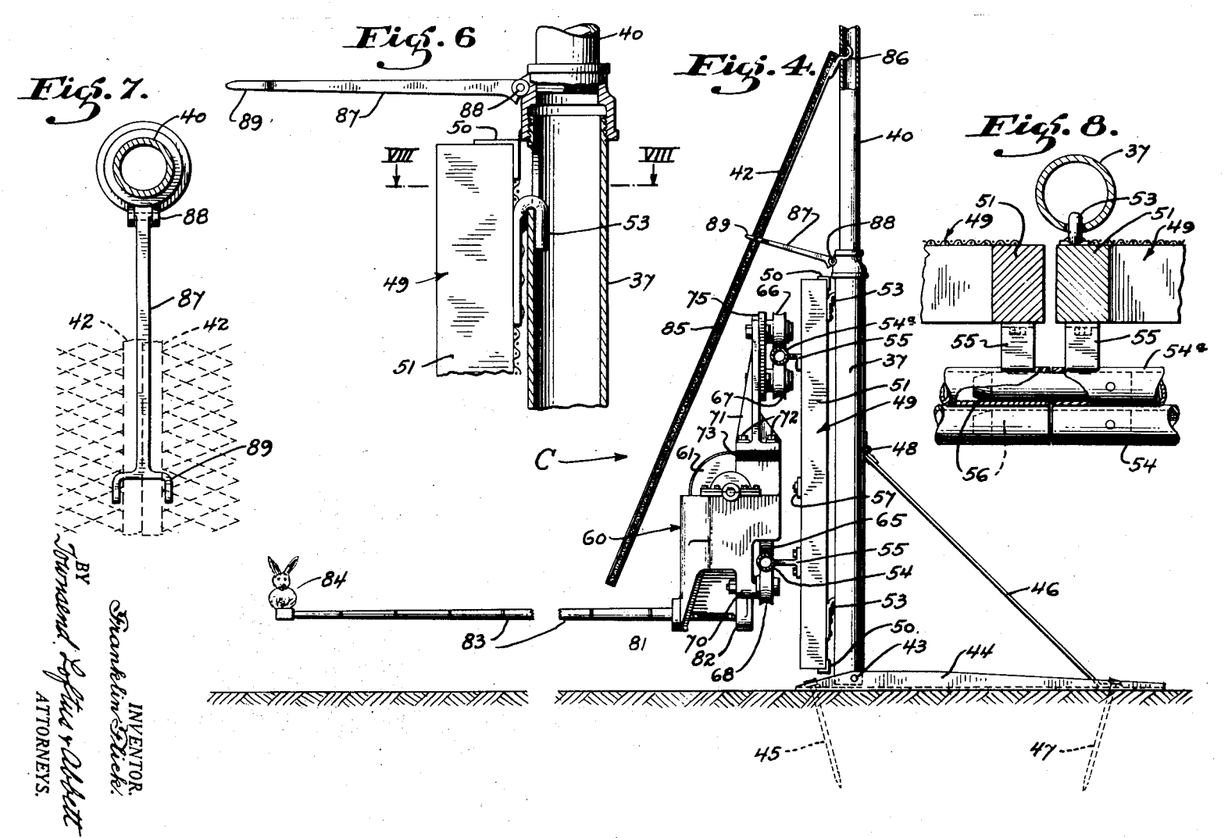
Fig. 4 is an enlarged vertical cross section of the inner boundary fence, showing the track rails positioned on the fence, said view also showing the car on the track rails and the guard panel which protects the dogs against injury.
Fig. 6 is an enlarged detail section of one of the inner boundary fence posts showing the manner of connecting the rail supporting panels thereto, said view also showing one of the brace arms whereby the protecting panels are supported.
Fig. 7 is a plan view of one of the brace arms whereby the protecting panel is supported.
Fig. 8 is a cross section taken on line VIII—VIII of Fig. 6.
Figures 5, 9, 10, 11, 12:
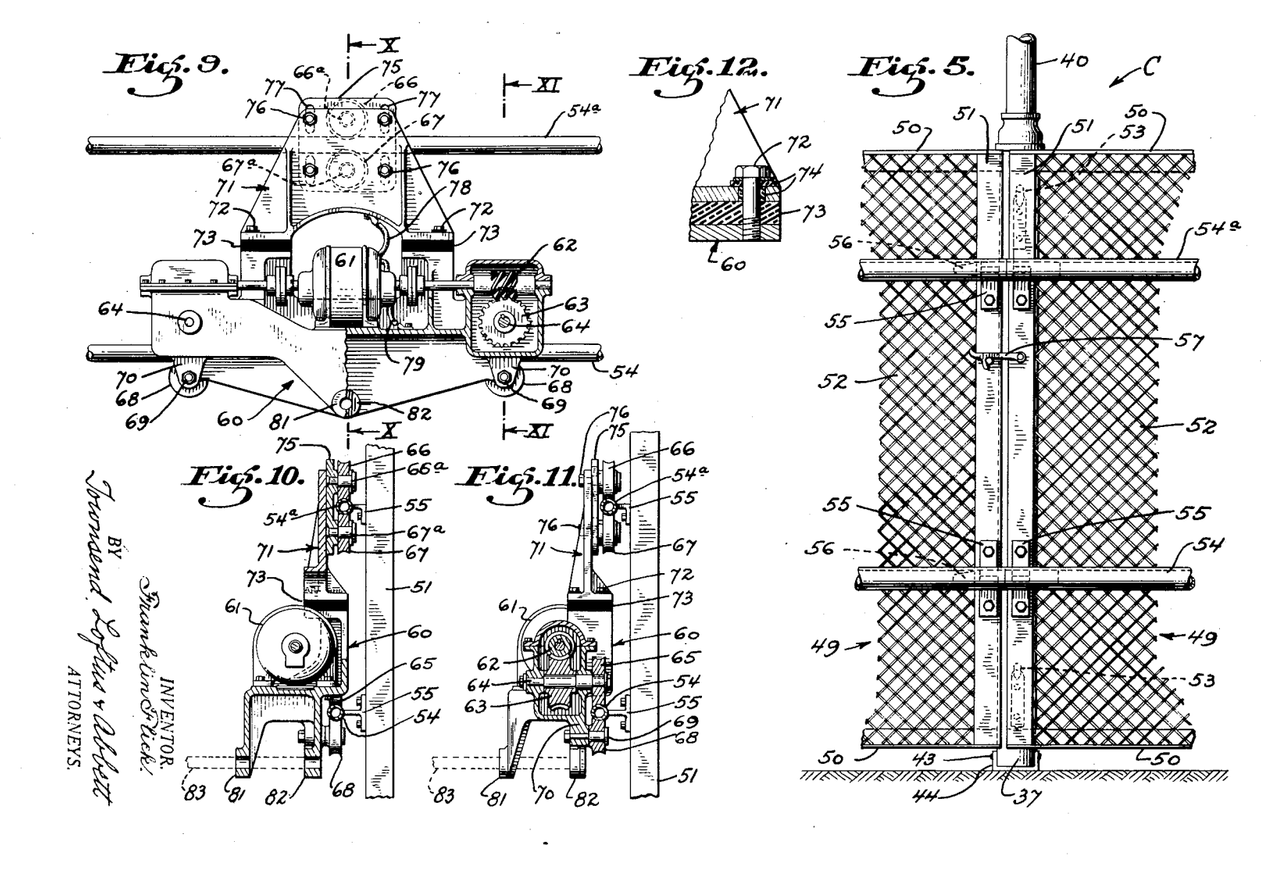
Fig. 5 is a front view of the inner boundary fence showing the manner in which the inner rail supporting panels are supported and connected, said view also showing the manner of connecting the rails.
Fig. 9 is a front view of the motor driven car and the rail supporting the same.
Fig. 10 is a cross section taken on line X—X of Fig. 9.
Fig. 11 is a cross section taken on line XI—XI of Fig. 9.
Fig. 12 is a detail section showing the manner of insulating the car frame with relation to the rails.
Figure 13:
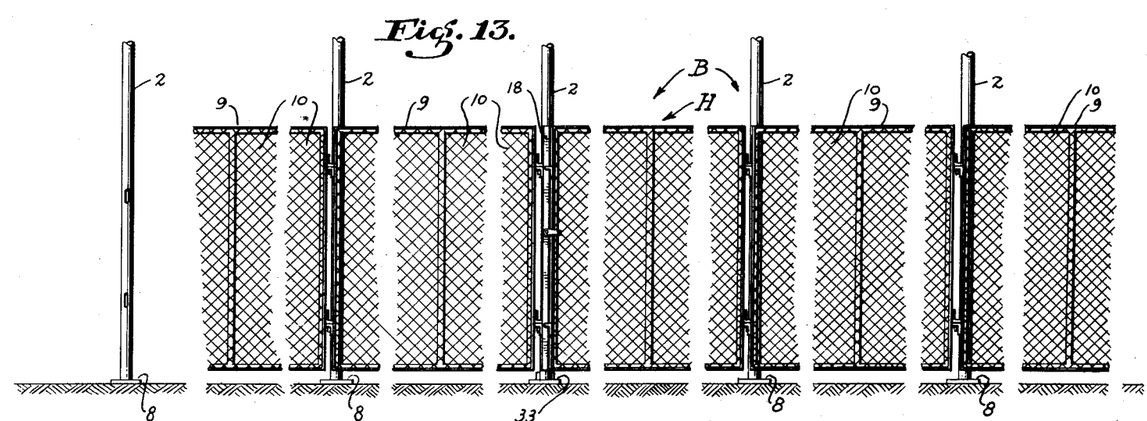
Fig. 13 is a front view of the outer boundary fence.

By referring to Figs. 9, 10, and 11, it will be noted that a pair of lugs are extended downwardly from the main frame 60 at a point substantially centrally thereof as indicated at 81 and 82. These lugs form a support for an arm 83, see Fig. 4, and this in turn forms a support for the lure indicated at 84 which may be in the form of a stuffed rabbit or the like. The arm 83 is preferably constructed of a flexible material such a bamboo or the like so that as the car runs over the track rails 54a and 54, a life-like appearance and movement is given the lure. That is, the track is not absolutely level; in fact it is not desirable as the slight undulations formed by an uneven track causes an up and down movement of the lure giving it the appearance of hopping along the ground surface.

The rails 54a and 54 employed in the present instance are known as live rails as they not only function as a support for the car, but also as current carrying conductors for the motor wherein the car is driven. Such rails must be covered as the dogs might otherwise contact therewith and form a short circuit with the ground. It is furthermore essential that the car be covered as a dog might get away and become injured, hence it is essential that guard panels be employed so as to form an enclosure or covering protecting the dogs both from the car and the rails. These panels are best shown in Fig. 4. They are rectangular frames constructed of angle iron, or the like, covered with a mesh such as indicated at 85. The upper ends of the panel sections are provided with hooks 86 adapted to enters slots in the posts and to interlock when inserted. They are supported in an inclined position with relation to the rails and the car as shown in Fig. 4, by means of brace arms 87. These arms are best illustrated in Figs. 6 and 7.

They are pivotally secured at their inner ends to the respective posts as shown at 88. Their outer ends are fork-shaped as shown at 89, the spacing between the forks being sufficient to straddle the adjacent ends of two protecting panels and to enter between the meshes of the wire fabric as shown in Fig. 7. By so entering they are secured against pivotal movement when placed in position and at the same time form a support which maintains all the protecting panels in the same angular position, thus forming a continuous protective surface completely around the inner side of the race course which eliminates all danger to the dogs. The lower ends of the protective panels are held above the ground surface a sufficient distance to maintain a clear passage for the supporting arm 83 which carries the lure, the distance from the ground being so low as to prevent the dogs from crawling under.

The entire equipment so far described is sectional in construction. It may be quickly erected and placed in position and just as readily taken down. The posts forming the outer fence may all be assembled when taking down the structure and so may the pegs 7 whereby they are supported. They may thus be arranged in a comparatively compact space for shipment, storage, or otherwise. The same is true of the panels forming the outer fence 9 as these are similar in construction and as such may be piled or stacked in a compact space.

The interior fence may similarly be taken down by removing the inner portecting panels 42 and stacking them and then by removing the panels 49 which carries the rail sections. The posts may then be taken down and the folding parts 44 and 46 folded parallel so as to occupy as small a space as possible. The goose neck ends on both sets of poles and indicated at 3 and 38 may be pulled off or unscrewed with relation to the upper ends of the poles and separately stored if desired. The entire equipment may in this manner be quickly taken down and packed in a comparatively small space for storage, shipment, or otherwise. The grandstand, the control tower, the judges' stand, the dog kennels, etc. may also be of a knockdown construction, but as no detail construction is shown thereof claims thereto are not being made.

While certain features of the present invention are more or less specifically described, I wish it understood that various changes may be resorted to within the scope of the appended claims. Similarly, that the materials and finishes of the several parts employed may be such as the manufacturer may decide, or varying condition or uses may demand.

Having thus described my invention, what I claim and desire to secure by Letters Patent is—

1. In portable equipment of the character described, a combination fence and rail support, comprising a plurality of post members, means for supporting the posts in a vertical position, a plurality of fence panel sections detachably secured with relation to the posts, a pair of rail members secured to each panel, and means for connecting the rails to form a pair of continuous tracks.

2. In portable equipment of the character described, a combination fence and rail support, comprising a plurality of post members, means for supporting the posts in a vertical position, a plurality of fence panel sections detachably secured with relation to the posts, a pair of rail members secured to each panel, means for connecting the rails to form a pair of continuous tracks, guard panels detachably secured to the posts, and means securing the guard panels in an extended position to form an enclosed runway for a car traveling on the rails.

3. In portable equipment of the character described, a combination fence and rails support comprising a plurality of post members, a foot plate pivotally connected to the lower end of each post, a brace member forming an adjustable connection between each post and foot plate, pegs for securing the foot plates, panels detachably secured with relation to the posts, a pair of rail sections carried by each panel, and means for connecting the rails to form a pair of continuous tracks.

4. In portable equipment of the character described, a combination fence and rail support comprising a plurality of post members, means for supporting the posts in a vertical position, a plurality of fence panel sections, hook-shaped members at one end of each panel forming a detachable connection between each panel and post and forming a support for one end of each panel, a pair of rail members being tubular in cross section, and a pair of pins secured in one end of each rail, said pins adapted to project into the ends of a pair of rails on an adjacent panel to connect the rails and to support that end of the adjacent panel.

5. In portable equipment of the character described, a combination fence and rail support comprising a plurality of post members, a plurality of panels, hook-shaped members at one end of each panel forming a detachable connection between each panel and post and forming a support for one end of each panel, a pair of rail members being tubular in cross section, a pin secured in one end of each rail, said pins adapted to project into the ends of a pair of rails on an adjacent panel to connect the rails and to support that end of the adjacent panel, and means for electrically insulating the rail sections with relation to the panels.

6. In portable equipment of the character described, a combination fence and rail support including a plurality of post members, a pair of rail members supported by the posts one above the other and forming a continuous runway for a power driven car, a plurality of guard panels detachably secured to the posts, and a plurality of arms interposed between the posts and the guard panels to maintain the panels in an extended position where they form a protecting cover for the runway.

7. In portable equipment of the character described, a combination fence and rail support including a plurality of post members, a pair of rail members supported by the posts one above the other and forming a continuous runway for a power driven car, a plurality of guard panels pivotally and detachably secured at their upper ends to the posts, and a plurality of arms interposed between the posts and the panels and supporting the panels in an inclined position where they form a protecting cover for the runway.

FRANKLIN FLICK.